(12) United States Patent
Yoo

(10) Patent No.: US 9,005,803 B2
(45) Date of Patent: Apr. 14, 2015

(54) SECONDARY BATTERY

(75) Inventor: Min-Jung Yoo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 387 days.

(21) Appl. No.: 13/106,588

(22) Filed: May 12, 2011

(65) Prior Publication Data

US 2012/0009451 A1    Jan. 12, 2012

(30) Foreign Application Priority Data

Jul. 12, 2010   (KR) ........................ 10-2010-0066859

(51) Int. Cl.
| | |
|---|---|
| H01M 2/00 | (2006.01) |
| H01M 10/04 | (2006.01) |
| H01M 2/04 | (2006.01) |
| H01M 2/26 | (2006.01) |
| H01M 2/02 | (2006.01) |

(52) U.S. Cl.
CPC ........ H01M 10/0431 (2013.01); H01M 2/0434 (2013.01); H01M 2/263 (2013.01); H01M 2/0277 (2013.01)

(58) Field of Classification Search
CPC .................................................. H01M 10/0431
USPC .................... 429/94, 163, 161, 180, 208, 172
See application file for complete search history.

(56) References Cited

U.S. PATENT DOCUMENTS

| | | | | |
|---|---|---|---|---|
| 2001/0004505 | A1* | 6/2001 | Kim et al. ...................... | 429/180 |
| 2004/0234846 | A1* | 11/2004 | Han et al. ...................... | 429/163 |
| 2009/0096418 | A1 | 4/2009 | Abadia et al. | |
| 2009/0263703 | A1* | 10/2009 | Kim ................................ | 429/53 |
| 2010/0143773 | A1 | 6/2010 | Honbou | |
| 2010/0176764 | A1 | 7/2010 | Tachikawa et al. | |
| 2011/0045333 | A1* | 2/2011 | Kim et al. ..................... | 429/120 |

FOREIGN PATENT DOCUMENTS

| | | |
|---|---|---|
| JP | 10-040881 | 2/1998 |
| JP | 2005005215 | 1/2005 |
| JP | 2008-135374 | 6/2008 |
| JP | 2008-210729 | 9/2008 |
| JP | 2010135170 | 6/2010 |

(Continued)

OTHER PUBLICATIONS

JP H10-040881 MT.*

(Continued)

*Primary Examiner* — Patrick Ryan
*Assistant Examiner* — Alex Usyatinsky
(74) *Attorney, Agent, or Firm* — Robert E. Bushnell, Esq.

(57) ABSTRACT

A secondary battery that can easily adjust power by disposing a plurality of jelly-rolls for the secondary battery in a case and connecting electrodes of the jelly-rolls in either electrical series or in electrical parallel, with corresponding welds. The secondary battery is constructed with a plurality of jelly-rolls each having a first electrode tab and a second electrode tab protruding from the jelly-roll, a case having an opening accommodating insertion of the jelly-rolls, and a cap plate sealing the opening of the case and bearing electrode terminals on a bottom side of the cap plate facing the jelly-rolls. The first electrode tabs protruding from the jelly-rolls are electrically connected to the electrode terminals and the second electrode tabs protruding from the jelly-rolls are electrically connected to the cap plate.

16 Claims, 10 Drawing Sheets

(56) References Cited

FOREIGN PATENT DOCUMENTS

| KR | 10-1998-0057673 | | 9/1998 |
| KR | 1020000051440 | A | 8/2000 |
| KR | 1020030066172 | A | 8/2003 |
| KR | 1020080010148 | A | 1/2008 |

OTHER PUBLICATIONS

KR 1020080010148 MT.*

JP 2005_005215 MT.*

Korean Office Action issued on Apr. 9, 2012 in connection with Korean Patent Application Serial No. 10-2010-0066859 and Request for Entry of the Accompanying Office Action attached herewith.

Korean Office Action dated Sep. 7, 2011 of the Korean Patent Application No. 10-2010-0066859. With its English translation.

Korean Notice of Allowance dated Oct. 8, 2012 of the Korean Patent Application No. 10-2010-0066859. With its English translation.

* cited by examiner

SECONDARY BATTERY

CLAIM OF PRIORITY

This application makes reference to, incorporates into this specification the entire contents of, and claims all benefits accruing under 35 U.S.C. §119 from an application earlier filed in the Korean Intellectual Property Office filed on Jul. 12, 2010 and there duly assigned Ser. No. 10-2010-0066859.

BACKGROUND OF THE INVENTION

1. Field of the Invention

One or more embodiments of the present invention relate to a secondary battery, in more detail, a secondary battery that makes it possible to electrically connect an electrode terminal or a cap plate with a plurality of electrode tab, using various types of welding.

2. Description of the Related Art

In general, various types of secondary batteries are used as power supplies that supply power to electronic devices and electric vehicles. A plurality of cells may be electrically connected in series or in parallel to supply necessary power, when those secondary batteries increase in size.

A jelly-roll, which is one cell, has a limited power that the jelly-roll can generate. Therefore, it is preferable to achieve desired capacity by connecting a plurality of cells in series or in parallel, rather than using one cell having large capacity, in order to implement large-sized secondary batteries. Accordingly, it is required to achieve necessary power by connecting a plurality of jelly-rolls and keep the charge amount of current.

It is difficult to smoothly operate the engine of electric vehicles with low power and it is impossible to operate the engine for a long period of time with a small charge amount. Therefore, it needs to achieve a necessary amount of power and current by organically connecting a plurality of jelly-roll.

SUMMARY OF THE INVENTION

One or more embodiments of the present invention provide an improved secondary battery.

One or more embodiments of the present invention provide a secondary battery that can easily control power by connecting the electrode tabs of a plurality of jelly-rolls disposed in a case with an electrode terminal or a cap plate, using various types of welding.

One or more embodiments of the present invention further provide a secondary battery that makes it possible to easily bend the electrode tab by forming slits at a predetermined distance on the surface of the electrode tab.

A secondary battery according to an embodiment of the present invention may be constructed with a plurality of jelly-rolls each having a first electrode tab and a second electrode tab protruding from the jelly-rolls, a case having an opening and receiving the jelly-rolls, and a cap plate sealing the opening of the case and having electrode terminals on a bottom side of the cap plate facing the jelly-rolls. The first electrode tabs protruding from the jelly-rolls may be electrically connected to the electrode terminals, and the second electrode tabs protruding from the jelly-rolls may be electrically connected to the cap plate.

In this configuration, the jelly-rolls may be formed in a cylindrical shape or a flat tube shape.

Further, the secondary battery may further include an insulating case disposed between the jelly-rolls and the cap plate.

The insulating case may have a plurality of holes through which the first electrode tabs and the second electrode tabs pass.

In this configuration, the insulating case may be made of an elastic material.

Further, the first electrode tabs may have negative polarity and the second electrode tabs may have positive polarity.

Further, the first electrode tabs and the electrode terminals, and the second electrode tabs and the cap plate, may be respectively electrically connected by welding.

Furthermore, the cap plate and the electrode terminals may be electrically insulated from each other.

Further, the insulation between the cap plate and the electrode terminals may be implemented by forming an insulating layer on the electrode terminals.

Further, the insulation between the cap plate and the electrode terminals may be implemented by disposing an insulating block.

In this configuration, the insulating block may have an outer side formed in the same shape as an electrode terminal hole formed through the cap plate, and the insulating block may have a terminal hole formed through the insulating block. An inner side of the terminal hole may be formed in the same shape as the electrode terminal.

Further, a step may be formed at at least one of an upper end and a lower end of the insulating block. The step may extend outward from the insulating block.

In addition, the first electrode tabs and the second electrode tabs may be coated with an insulating coating layer.

Further, the first electrode tabs and the second electrode tabs may have slits for bending on the surface of the first electrode tabs and the second electrode tabs.

Furthermore, the slits may be alternately formed at a predetermined distance on both sides of the first electrode tab and the second electrode tab.

Further, the first electrode tabs or the second electrode tabs may be arranged in a line.

A secondary battery according to another embodiment of the present invention may be constructed with a plurality of jelly-rolls each having a first electrode tab and a second electrode tab protruding from the jelly-rolls, a case having an opening and receiving the jelly-rolls, and a cap plate sealing the opening of the case and having cathode electrode terminals and anode electrode terminals on a bottom side of the cap plate facing the jelly-rolls. The first electrode tabs may be electrically connected to the cathode electrode terminals, and the second electrode tabs may be electrically connected to the anode electrode terminals.

In this configuration, the first electrode tabs and the cathode electrode terminals, and the second electrode tabs and the anode electrode tabs, may be respectively electrically connected by welding.

According to the present invention, since it is possible to easily adjust power by connecting a plurality of jelly-rolls in parallel or in series using various types of welding, it is possible to produce a battery at high output and high level.

Further, since it is possible to improve connection force between the electrode terminals or the cap plate and the electrode tabs, it is possible to effectively collect electricity and improve durability.

Further, it is possible to easily combine the case and the cap assembly by bending and folding the electrode tabs on the top of the jelly-rolls.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
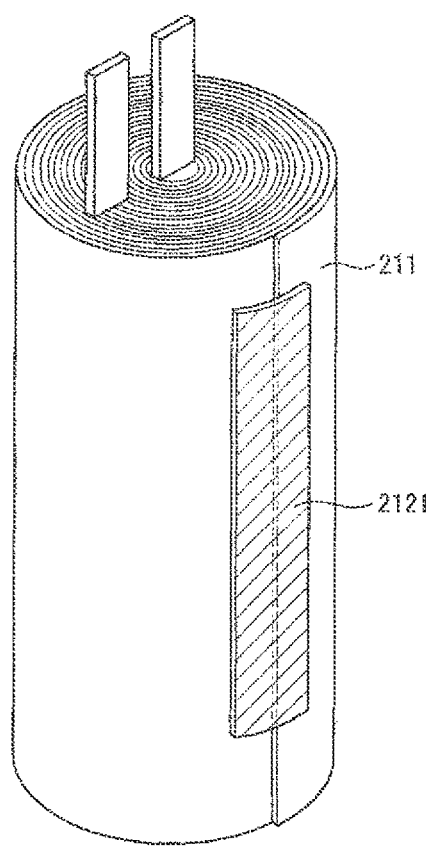
FIG. 1 is an oblique view of a contemporary cylindrical jelly-roll.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

A secondary battery according to the present invention is described hereafter in detail with reference to the accompanying drawings showing embodiments of the present invention.

Assume some conditions before describing in detail the present invention. First, the present invention may be implemented in other ways different from the embodiments disclosed herein, such that it should be understood that other modified embodiments according to the spirit of the present invention is construed as being included in the scope of the present invention.

Second, when it is determined that detailed descriptions for well-known technologies or configurations may unnecessarily make the point of the present invention unclear, the detailed descriptions are not provided, in explaining the present invention.

Third, the same component shown in the drawings are designated by the same reference numerals and characters, even if they are shown in different drawings. However, if the same components are designated by different reference numerals and the reference numerals and characters are directly stated in the detailed description, the technical meanings according to the description will be the spirit of the present invention.

Fourth, the size or thickness of each layer may be exaggerated in the drawings for the convenience of description and clarity, and may be different from the thickness or size of the actual layers.

FIG. 1 is an oblique view showing a contemporary cylindrical jelly-roll.

Referring to FIG. 1, a cylindrical jelly-roll 211 is formed by winding a separator, an anode current collector and a cathode current collector. The separator is disposed between the anode current collector and the cathode current collector. Cylindrical jelly-roll 211 is finished with an exterior tape 2121. Accordingly, jelly-roll 211 is not easily unrolled. One jelly-roll 211, which makes one cell, has a limited power that the jelly-roll can generate. Therefore, it is possible to achieve necessary power and keep the charge amount of current by connecting a plurality of jelly-rolls 211.

Figure 2:
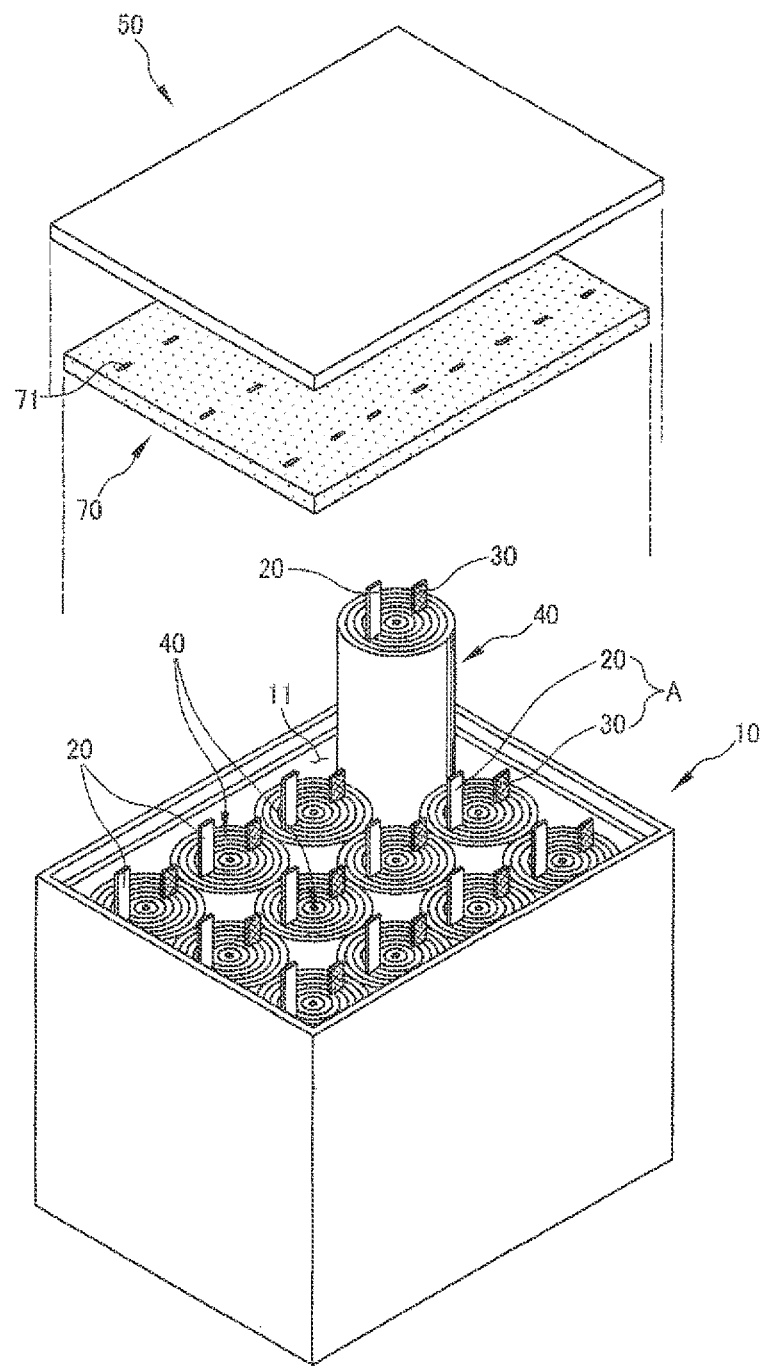
FIG. 2 is an exploded oblique view of a secondary battery constructed as an embodiment according to the principles of the present invention, when the jelly-rolls are disposed and connected in a case.
Figure 3:
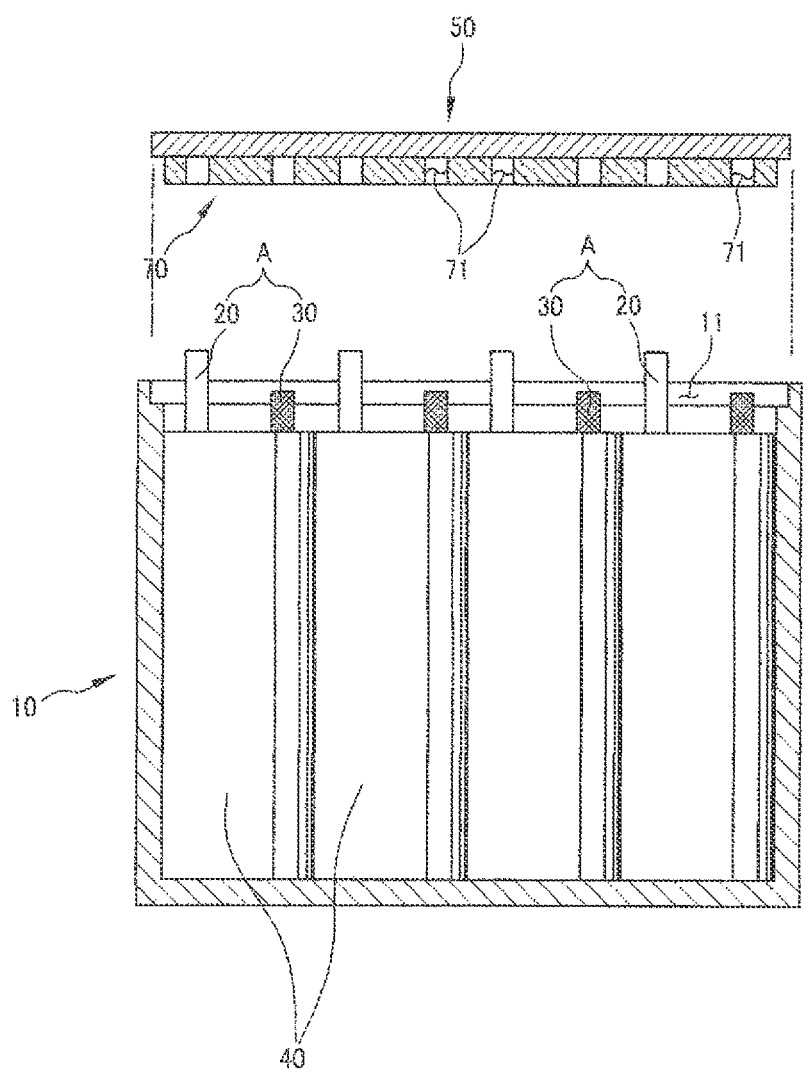
FIG. 3 is a cross-sectional view showing the secondary battery of FIG. 2.

FIG. 2 is an oblique view of a secondary battery constructed as an embodiment according to the principles of the present invention, and FIG. 3 is a cross-sectional view of the secondary battery shown in FIG. 2.

Referring to FIGS. 2 and 3, the secondary battery of the present invention includes a plurality of jelly-rolls 40 and a case 10 accommodating jelly-rolls 40. Each jelly-roll 40 has a first electrode tab 20 and a second electrode tab 30 that protrude from jelly-roll 40. An opening 11 is formed at the top of case 10. Further, a cap plate 50 is formed at opening 11 of case 10 to seal opening 11. Electrode terminals 60 (see FIG. 4) are disposed on the bottom of cap plate 50, such that first electrode tab 20 and second electrode tab 30 are respectively and electrically connected with cap plate 50 and electrode terminal 60.

That is, the secondary battery of the present invention includes the jelly-rolls accommodated in case 10. Further, it is possible to increase power generated from jelly-rolls 40 disposed in the secondary battery in various ways, including series and parallel connection, and to adjust the charge amount. Case 10 may be formed in various shapes and the size of case 10 may be freely adjusted, if necessary. Therefore, it is possible to adjust the number of jelly-rolls 40 accommodated therein, corresponding to the volume of case 10.

Each jelly-roll 40 has two protruding electrode tabs A. The present invention provides first electrode tab 20 and second electrode tab 30, in which if one electrode tab is a cathode, the other electrode becomes an anode. The present specification does not specify the polarity of the electrode tabs because the secondary battery of the present invention is not influenced by the connection type of the electrode tabs. If first electrode tab 20, which is longer in the figures, is a cathode, second electrode tab 30, which is shorter in the figures, becomes an anode; whereas if first electrode tab 20 is an anode, second electrode tab 30 becomes a cathode.

First electrode tab 20 and second electrode tab 30 are connected with electrode terminals 60 (see FIG. 4) formed on cap plate 50 or in the body of case 10 to be able to be connected with an external electronic device.

To be more specific, first electrode tab 20 and second electrode tab 30 should be used as a cathode or an anode by being connected to cap plate 50 or electrode terminals 60. The cathode and the anode should be connected to an electronic device, when the electronic device uses the secondary battery of the present invention. An electrode terminal for connection with an electronic device may be cap plate 50 or electrode terminal 60 formed on cap plate 50, in the secondary battery of the present invention.

Figure 4A:
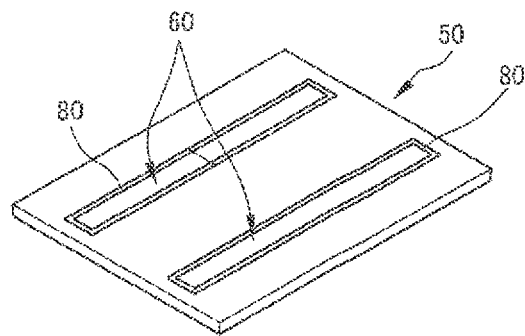
FIG. 4A is an oblique view of a cap plate constructed as an embodiment according to the principles of the present invention.

FIG. 4A is an oblique view of a cap plate constructed as an embodiment according to the principles of the present invention. In FIG. 4A, cap plate 50 is formed with rectangular electrode terminals 60. When first electrode tab 20 protruding from jelly-roll 40 of the present invention is connected to rectangular electrode terminal 60, second electrode tab 30 is connected to cap plate 50 which is disposed outside of rectangular electrode terminal 60. Therefore, when first electrode tab 20 is a cathode, the portion of cap plate 50 which is disposed outside of electrode terminal 60 becomes an anode by electrically connecting to second electrode tab 30.

As a result, the important connecting configuration of the present invention is to form a cathode and an anode by selectively connecting the electrode tabs A protruding from jelly-rolls 40 to cap plate 50 or electrode terminals 60.

The embodiment of the present invention is sequentially described in more detail hereafter.

Jelly-roll 40 according to the present invention may be the cylindrical jell-roll 40 or a flat tube-shaped jelly-roll 40. Cylindrical jelly-rolls 40 that are commonly used are shown in FIGS. 1 and 2.

Figure 6:
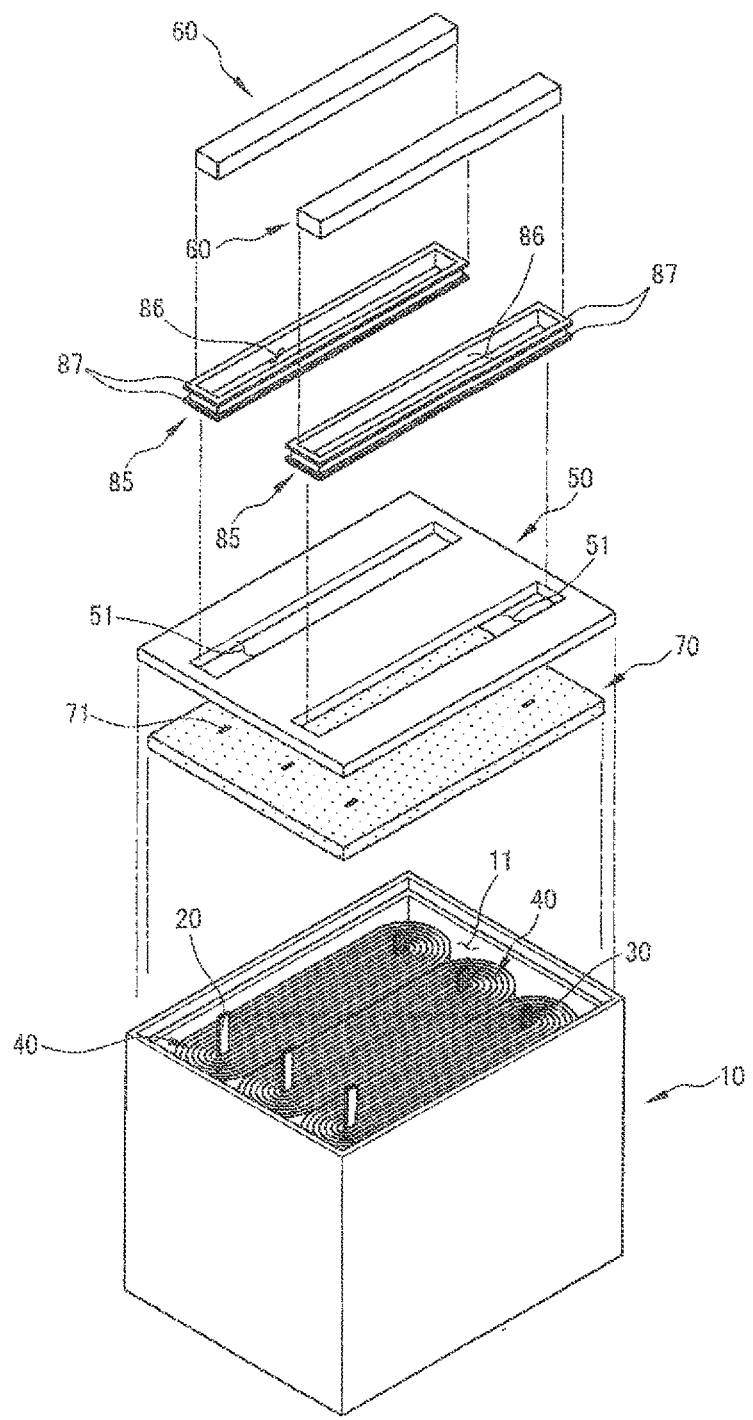
FIG. 6 is an exploded oblique view showing a secondary battery constructed as another embodiment according to the principles of the present invention.

The present invention is, however, not limited to the cylindrical jelly-rolls that are disposed in the case. In another embodiment according to the principles of the present invention, as shown in FIG. 6, elliptical flat tube-type jelly-rolls may be loaded and used. It is possible to selectively connect first electrode tabs 20 and second electrode tabs 30 which protrude from the flat tube-shaped jelly-rolls 40 to cap plate 50 or specific electrode terminals 60 formed on cap plate 50 to use the secondary battery.

However, short circuit is likely to occur, when unnecessary portions are electrically connected during the connection of electrode tabs A and electrode terminals 60 (when the cap plate is connected with the electrode tabs, the cap plate can be referred to as an electrode terminal). Therefore, in an embodiment according to the principles of the present invention, as shown in FIG. 2, an insulating case 70 with a plurality of holes 71 through which first electrode tabs 20 and second electrode tabs 30 pass, is disposed between jelly-rolls 40 and cap plate 50.

When first electrode tabs 20 and second electrode tabs 30 are connected with a selected one of electrode terminal 60 and cap plate 50 which is disposed at opening 11 of case 10, first electrode tabs 20 and second electrode tabs 30 are non-uniformly bent, such that short circuit may occur. Further, the bending of electrode tabs A may generate short circuit due to friction with cap plate 50 and the inner circumference of case 10.

This problem can be removed by disposing insulating case 70 in the space between the top of jelly-rolls 40 and cap plate 50.

As shown in the figures, holes 71 are formed in insulating case 70 such that electrode tabs A can be connected with electrode terminals 60 through holes 71. It is preferable to separately form holes 71, and the number of holes is the same as the number of first electrode tabs 20 and second electrode tabs 30. Obviously, two or more electrode tabs A may pass through one hole 71, but it is possible to form the same number of holes 71 as the number of electrode tabs A, which pass through holes 71, in insulating case 70 to perfectly prevent short circuit.

Further, insulating case 70 constructed as an embodiment according to the principles of the present invention is made of an elastic material. Insulating case 70 may be made of a nonconductor that is not electrically conductive. It is possible to use a material having slight elasticity, such as rubber, in nonconductors (ceramic, rubber, silicon, various synthetic resin, and nonconductive metal) in order to form insulating case 70. The reason for insulating case 70 to have elasticity is for fitting insulating case 70 in opening 11 of case 10 such that the outer side of insulating case 70 is in close contact with the inner circumference of case 10 in order to prevent gas or liquid-state electrolyte from leaking out of the case. Insulating case 70 may be formed to have a slightly larger volume or area than opening 11 of case 10. In this way, insulating case 70 may be press-fitted in case 10 to prevent the electrolyte from leaking out through between the inner circumference of the case and the outer side of insulating case 70 by the elasticity of insulating case 70.

Further, holes 71 themselves may hold electrode tabs A, when first electrode tabs 20 or second electrode tabs 30 are fitted therein. That is, the size of holes 71 may be the same as or a little smaller than that of electrode tabs A that are inserted therein such that electrode tabs A can be fitted by a predetermined pressing force. First electrode tabs 20 and second electrode tabs 30 should be connected to cap plate 50 or electrode terminals 60 formed on cap plate 50 by welding etc., after passing through holes 71. When hole 71 is larger in size than electrode tab A, electrode tab A is likely to be pushed toward jelly-rolls 40, that is, into case 10, after passing through hole 71.

On the other hand, in the embodiment of the present invention, the size of hole 71 is the same as or a little smaller than that of electrode tab A that is inserted therein. Therefore, once passing through hole 71, electrode tab A fitted in hole 71 can not be easily pulled out. For this configuration, it is possible that the size of hole 71 is slightly smaller than that of electrode tab A, and insulating case 70 is made of an elastic material.

Next, the connection method of electrode tabs A and electrode terminals 60 of the secondary battery of the present invention is described in more detail with reference to more specific embodiments.

Figure 5A:
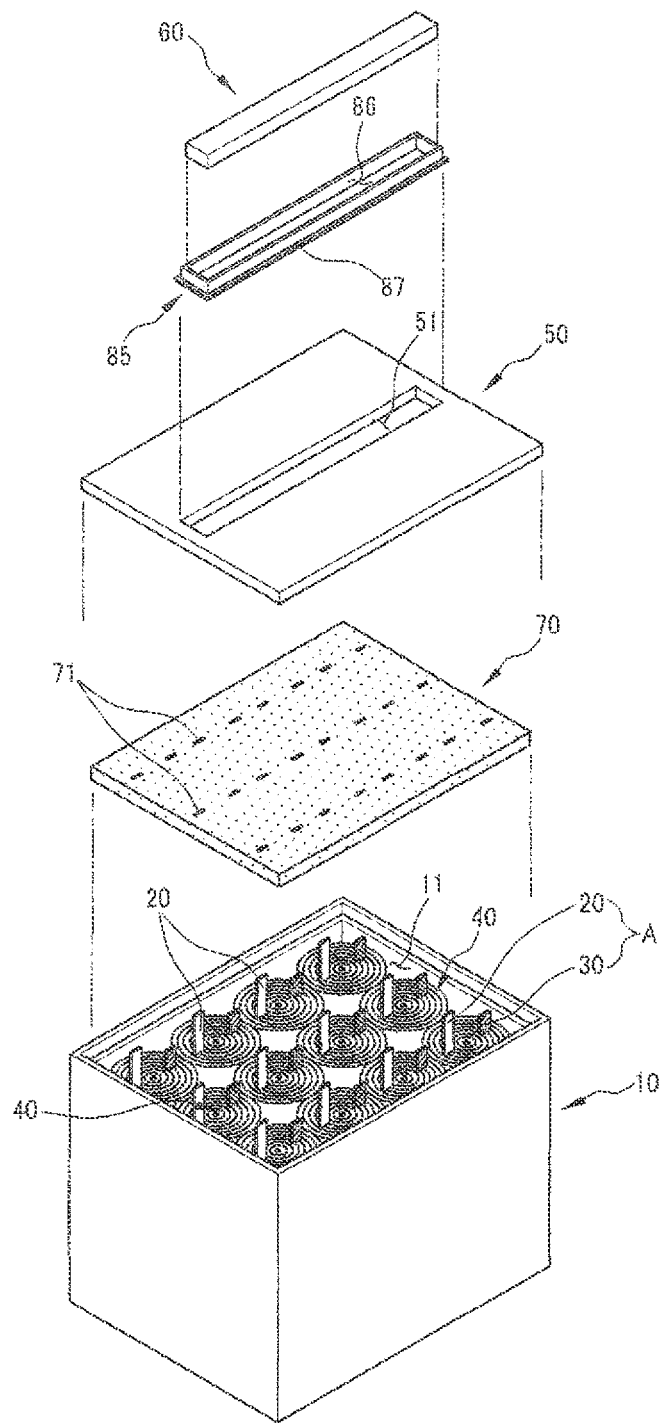
FIGS. 5A and 5B are an exploded oblique view and a cross-sectional view, respectively, showing a secondary battery constructed as another embodiment according to the principles of the present invention.
Figure 5B:
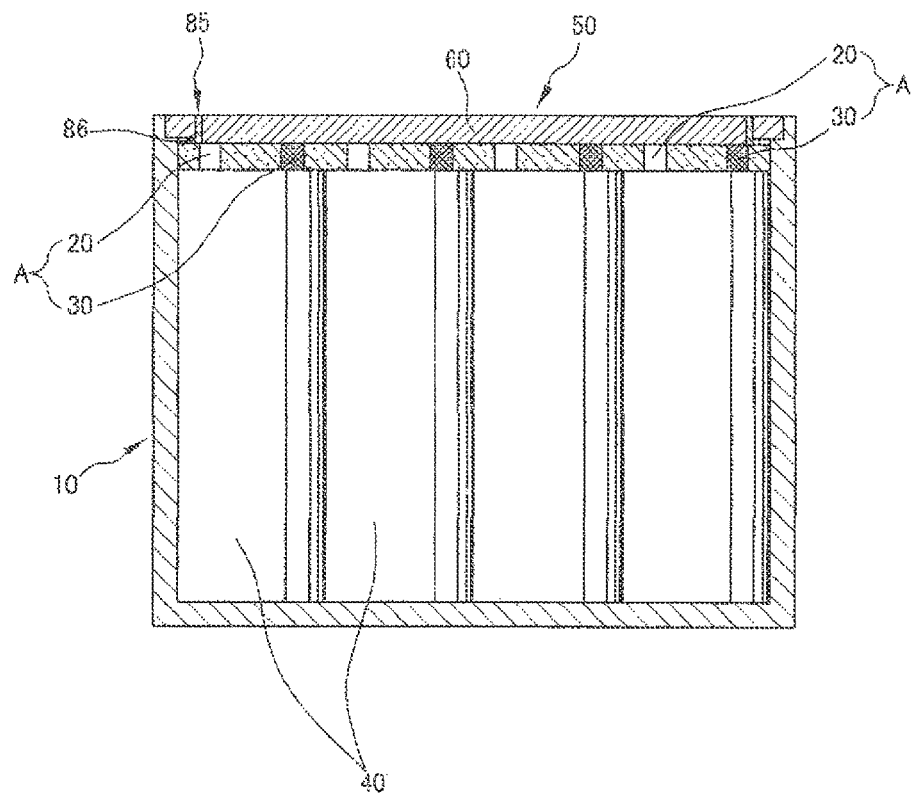

FIGS. 5A and 5B are an exploded oblique view and a cross-sectional view, respectively, showing a secondary battery constructed as an embodiment according to the principles of the present invention. According to this exemplary embodiment of the principles of the present invention, first electrode tabs 20 are connected with electrode terminals 60 and second electrode tabs 30 are connected with cap plate 50 in the present invention. Referring to FIG. 5A, one of first electrode tab 20 and second electrode tab 30 is connected to electrode terminal 60 formed at one side of cap plate 50 and the other one of first electrode tab 20 and second electrode tab 30 is connected to cap plate 50 disposed outside electrode terminal 60. This is an embodiment when cap plate 50 becomes another electrode terminal. As shown in FIG. 5A, rectangular electrode terminal 60 is formed at one side of cap plate 50 and one of first electrode tab 20 and second electrode tab 30 is connected to electrode terminal 60. When first electrode tab 20 is connected to electrode terminal 60, second electrode tab 30 is directly connected to the bottom of cap plate 50. In this configuration, a plurality of first electrode tabs 20 and second electrode tabs 30 may be respectively connected to electrode terminals 60 and cap plate 50.

As a result, in this embodiment, one electrode terminal 60 is formed on cap plate 50 and a portion of cap plate 50 disposed outside of electrode terminal 60 is used as another electrode terminal having different polarity from electrode terminal 60.

Further, in the embodiment of the present invention, first electrode tab 20 may have negative polarity and second electrode tab 30 may have positive polarity, and first electrode tab 20 and electrode terminal 60, and second electrode tab 30 and cap plate 50 are respectively connected by welding.

In the embodiment described above, when first electrode tab 20 is connected to electrode terminal 60 formed on cap plate 50 and second electrode tab 30 is connected to cap plate 50 itself, first electrode tab 20 becomes a cathode and second electrode tab 30 becomes an anode. Although it does not need to specifically discriminate them, first electrode tab 20 and electrode terminal 60, and second electrode tab 30 and cap plate 50 are respectively electrically connected in order to achieve electric connection such that electrons and ions can easily move. For this purpose, in the present invention, electrode terminal 60 and first electrode tab 20, and cap plate 50 and second electrode tab 30 are electrically connected by welding, respectively.

Further, unlike the embodiment shown in FIG. 5A, the embodiment shown in FIGS. 4 and 6 is as follows.

Figure 4B:
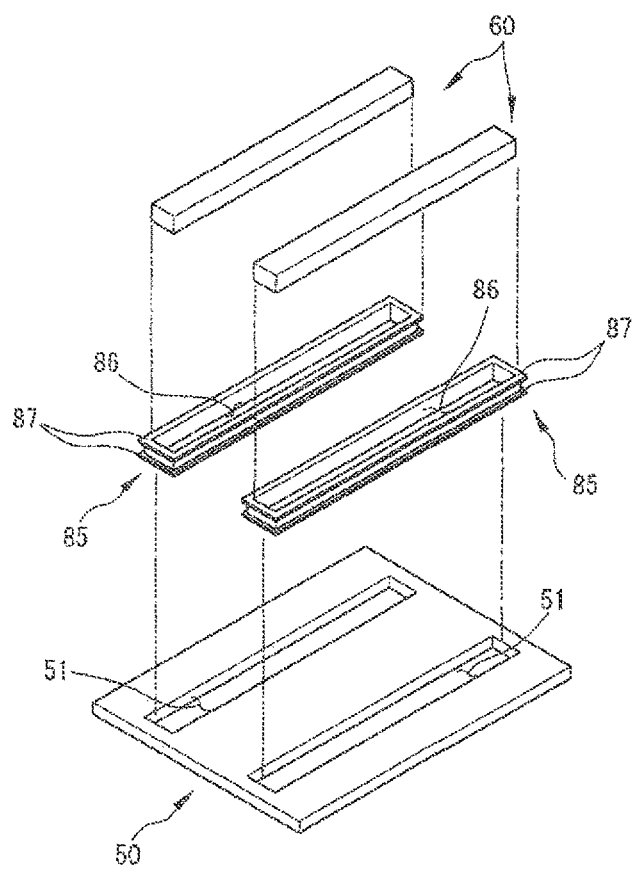
FIG. 4B is an exploded oblique view of a cap plate constructed as another embodiment according to the principles of the present invention.

FIG. 4B is an exploded oblique view of a cap plate constructed as another embodiment according to the principles of the present invention. FIG. 6 is an exploded oblique view showing a secondary battery constructed as another embodiment according to the principles of the present invention. As shown in FIG. 6, electrode terminal 60 has a cathode electrode terminal 61 and an anode electrode terminal 62. First electrode tab 20 may be electrically connected with cathode electrode terminal 61 and second electrode tab 30 may be electrically connected with anode electrode terminal 62.

As shown in FIGS. 4 and 6, first electrode tab 20 and second electrode tab 30 are respectively connected with separate electrode terminals 60 surrounded by insulating regions inside cap plate 50.

One electrode tab is connected to electrode terminal 60 formed at one side of cap plate 50 and the other electrode tab is connected to another electrode terminal 60 formed on another side of cap plate 50, which is separated from the above electrode terminal 60. Therefore, electrode terminals 60 become a cathode terminal and an anode terminal, respectively. In this configuration, it is not important whether electrode terminal 60 is the cathode electrode or the anode electrode, and the configuration may be freely modified, if necessary in manufacturing.

As shown in FIGS. 4A and 4B, two rectangular electrode terminals 60 are formed at one side of cap plate 50, and each one of first electrode tab 20 and second electrode tab 30 is respectively connected to a corresponding one of the two electrode terminals 60. When first electrode tab 20 is connected to electrode terminal 61 disposed at an inner portion of cap plate 50 which is further away from the viewer of the figures, second electrode tab 30 is connected to electrode terminal 62 formed at an outer portion of cap plate 50 which is closer to the viewer of the figures. In this configuration, a plurality of first electrode tabs 20 and second electrode tabs 30 may be connected to electrode terminals 60, respectively.

Further, first electrode tab 20 are second electrode tab 30 are respectively welded to electrode terminals 60 for electric connection.

In this configuration, it is necessary to basically block current flow between electrode terminals 60 and cap plate 50 by electrically insulating them. In this embodiment, the electric insulating material is provided around the electrode terminals 60 to prevent connection and current flow with adjacent portions.

As an embodiment according to the principles of the present invention as shown in FIG. 4A, in order to achieve the electric insulation, it is possible to coat the outer side of electrode terminal 60 passing through an electrode terminal hole 51 formed in cap plate 50 and the inner side of electrode terminal hole 51 formed in cap plate 50 with an insulating layer 80. As another embodiment, the insulation may be achieved by using a specific insulating material.

That is, electrode terminal hole 51 may be formed through cap plate 50 and electrode terminals 60 may be disposed in electrode terminal hole 51. The outer side of one of electrode terminals 60 is coated with insulating layer 80 to prevent an electric connection between the one electrode terminal 60 and cap plate 50 as well as an electric connection between the one electrode terminal 60 and the other electrode terminal 60. When insulating layer 80 is not provided, short circuit or discharging is likely to occur due to a difference of polarity between cap plate 50 and the other electrode terminal 60. Therefore, in order to overcome this problem, the outer side of the electrode terminal is coated with an insulating material to achieve insulation between cap plate 50 and the electrode terminal 60 in the present invention.

Further, referring to FIG. 6, it is possible to prevent electrons from moving between one electrode terminal 60 and the other electrode terminal 60 or the cap plate 50.

As shown in FIGS. 4B and 6 as another embodiment according to the principles of the present, an insulating block 85 is disposed between the outer side of electrode terminal 60 inserted in cap plate 50 and electrode terminal hole 51 formed through cap plate 50.

Electrode terminal hole 51 where electrode terminal 60 is inserted may be implemented in various ways in accordance with shape of electrode terminal 60. As described above, insulating block 85 made of an insulating material may be inserted in electrode terminal hole 51 such that outer side of electrode terminal 60 is not in contact with the inner side of electrode terminal hole 51, when electrode terminal 60 is inserted in electrode terminal hole 51. Insulating block 85 manufactured in a block shape in advance is fitted between the inner side of electrode terminal hole 51 and the outer side of electrode terminal 60, without coating or applying an insulating material to the outer side of electrode terminal 60, as in the embodiment described above.

Insulating block 85 is described in more detail. Insulating block 85 has a terminal hole 86 having the outer side in the same shape as electrode terminal hole 51 and the inner side in the same shape as electrode terminal 60. The most basic shape of insulating block 85 a block with lower step 87 removed from insulating block 85, that is, a block without any step protruding from the block.

Terminal hole 86 is formed such that the outer side of electrode terminal 60 can be inserted in terminal hole 86. Terminal hole 86 is formed in the same shape as electrode terminal hole 51 to be inserted in electrode terminal hole 51 of cap plate 50. Obviously, the shape of terminal hole 86 should be the same as the shape of electrode terminal 60. Insulating block 85 is inserted between electrode terminal 60 and electrode terminal hole 51, such that more effective insulation can be achieved.

Further, step 87 may be formed at the upper end and/or lower end of insulating block 85, and step 87 may extend outward from insulating block 85. In FIG. 5A, step 87 is formed at the lower end of insulating block 85 to support insulating block 85 from the lower portion of cap plate 50. In FIGS. 4B and 6, steps 87 are formed at the upper end and the lower end of insulating block 85 to support insulating block 85 from the upper and lower portions of cap plate 50.

As shown in FIG. 6, rectangular electrode terminal hole 51 is formed in cap plate 50, and insulating block 85 having the size as electrode terminal hole 51 is provided. Further, step 87 may be formed at the upper or lower portion of insulating block 85 to be exposed to the outside (shown in FIG. 5A). Alternatively, step 87 may be formed at the upper and lower portions (shown in FIG. 6). Step 87 further protrudes than the inner side of electrode terminal hole 51, such that step 87 can be easily fitted in electrode terminal hole 51.

Figure 7A:
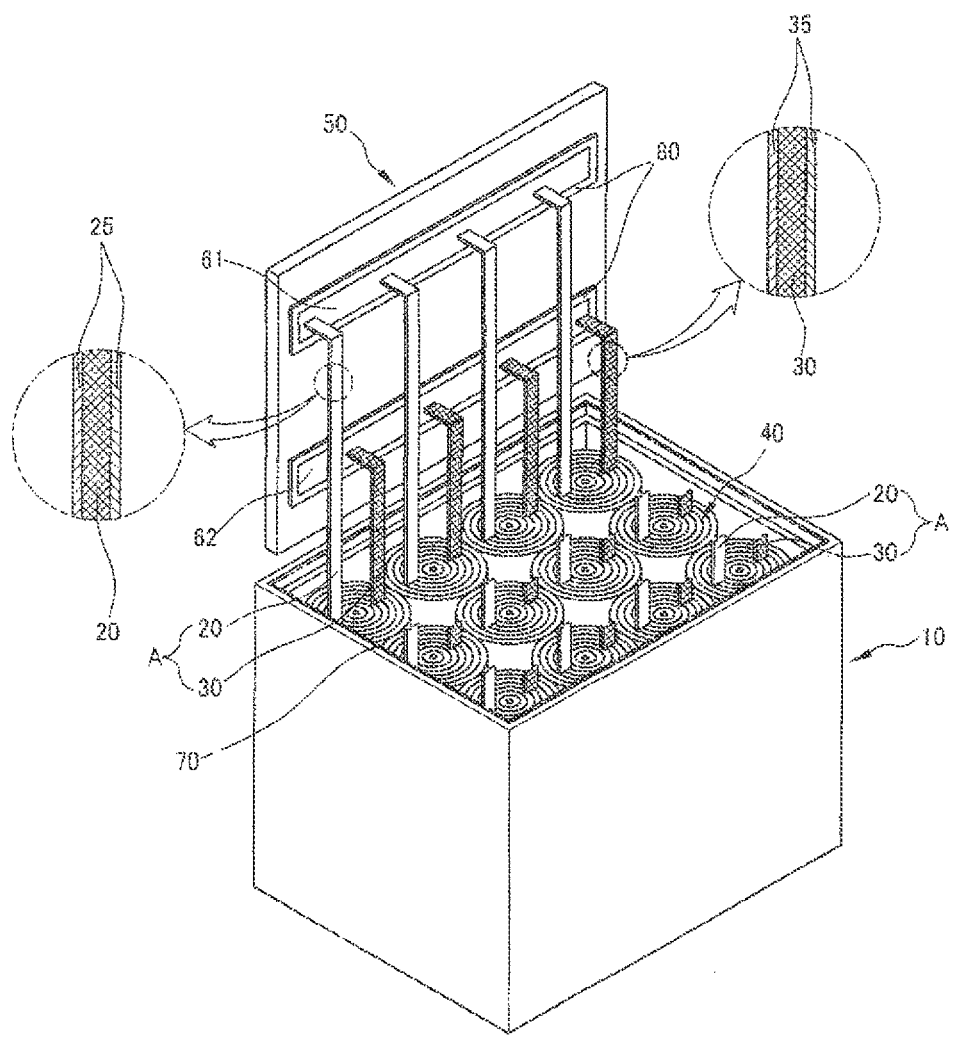
FIGS. 7A and 7B are oblique views illustrating the way of combining a cap plate to a case constructed as an embodiment according to the principles of the present invention.
Figure 7B:
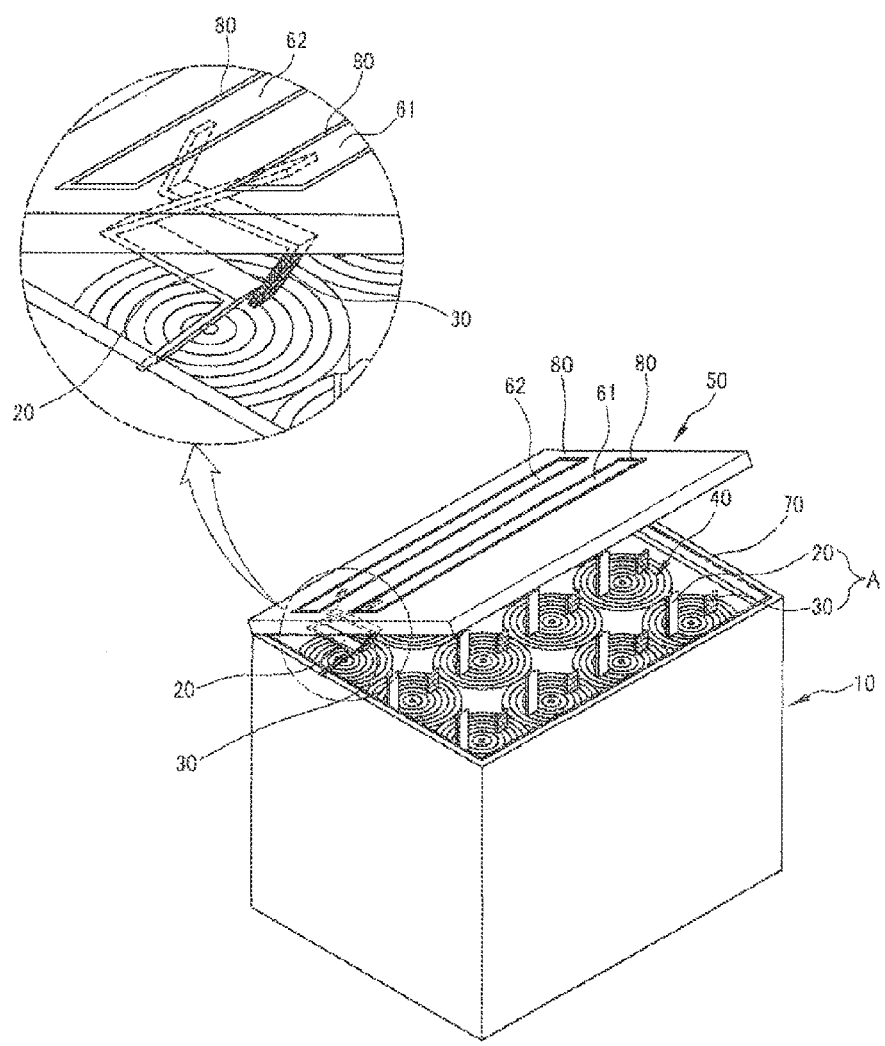

FIGS. 7A and 7B are oblique views illustrating the way of combining a cap plate to a case constructed as another embodiment according to the principles of the present invention; In this embodiment according to the principles of the present invention, insulating coating layers 25, 35 are formed on the outer sides of first electrode tab 20 and second electrode tab 30 in the present invention. As shown in FIG. 7A, first electrode tab 20 and second electrode tab 30, which are the cathode and the anode, function as current paths. Therefore, first electrode tab 20 and second electrode tab 30 are insulated from each other. For this configuration, insulating case 70 is disposed over jelly-rolls 40, and first electrode tabs 20 and second electrode tabs 30 may be elongated to connect jelly-rolls 40 to electrode terminals 60. However, when the elongated electrode tabs A are connected to cap plate 70, the elongated electrode tabs A overlap each other or are pressed. In order to overcome this problem, insulating coating layers 25, 35 are formed by coating the outer side of electrode tabs A with a predetermined insulating material. Insulating coating layers 25, 35 can prevent short circuit, even if first electrode tab 20 and second electrode tab 30 are in contact.

Next, the connection relationship of electrode terminal 60 is described with reference to more detailed embodiments of the present invention.

According to this embodiment of the principles of the present invention, as shown in FIG. 7, two electrode terminals 61 and 62 are formed on cap plate 50 and are respectively connected with electrode tabs A. The detailed shape of electrode terminals 61 and 62 are also shown in FIG. 7.

Electrode terminal 60 according to an embodiment of the present invention includes first electrode terminal 61 and second electrode terminal 62. First electrode terminal 61 and second electrode terminal 62 are rectangular, and penetrates cap plate 50 along a direction that is perpendicular to the major surface of cap plate 50. Second electrode terminal 62 is disposed at a predetermined distance from first electrode terminal 61. Further, first electrode terminal 61 and second electrode terminal 62 are inserted in the rectangular electrode terminal holes 51 to be electrically insulated from each other. First electrode tab 20 and second electrode tab 30 are welded to first electrode terminal 61 and second electrode terminal 62, respectively.

As shown in FIG. 7, electrode terminal hole 50 is formed through cap plate 50 in a long rectangular shape. The long rectangular shape is for easily welding electrode tabs A of jelly-rolls 40 arranged in rows and columns with first electrode terminal 61 and second electrode terminal 62, correspondingly.

This is because when first electrode terminal 61 or second electrode terminal 62 is formed at one side, it is possible to elongate first electrode tab 20 and second electrode tab 30, which protrude from jelly-roll 40 at the other side, to connect first electrode tab 20 and second electrode tab 30 to electrode terminal 60 at the side. Therefore, first electrode terminal 61 and second electrode terminal 62 corresponding to the length of insulating case 70 are specifically formed. Further, first electrode tabs 20 and second electrode tabs 30 which protrude in the rows and the columns in case 10 are electrically connected to electrode terminals 60 right above first electrode tabs 20 and second electrode tabs 30. This type of connection improves durability and can be easily achieved.

The separate first electrode tab 20 and second electrode tab 30 protrude from jelly-roll 40 and it may be difficult to weld electrode tabs A to electrode terminals 60 formed on cap plate 50 in accordance with the positions. That is, as shown in FIGS. 7 and 8, during the welding of electrode tabs A and electrode terminals 60, cap plate 50 is disposed in a position that is perpendicular to the major surface of the opening of case 10, and one side of cap plate 50 is aligned with a corresponding side of case 10. In this case, electrode tabs A of jelly-rolls 40 positioned far from electrode terminals 60 may be longer than the other electrode tabs A for easy welding.

Further, cap plate 50 having electrode terminals 60 may be vertically standing, when welding electrode tabs A to electrode terminals 60. In this case, the length of electrode tabs A should be larger than the substantial distance from cap plate 50 to jelly-rolls 40. Further, the length depends on the position of jelly-rolls 40.

It may be possible to make the length of electrode tabs A protruding from jelly-rolls 40 different in consideration of the problems in work, but this is little effective. It is possible to make the whole electrode tabs A long enough to be easily welded in jelly-rolls 40 in order to be easily used in various work environments, regardless of the position of jelly-rolls 40 having electrode tabs A. However, electrode tabs A are unavoidably bent in case 10, when cap plate 50 is fitted in case 10, because the distance between the upper end of jelly-rolls 40 or the upper end of insulating case 70 and cap plate 50 is small. The long first electrode tabs 20 or second electrode tabs 30 may randomly bend and overlap, and may be stacked. In general, electrode tabs A are made of a thin metal plate for current flow, in which electrode tabs A may be torn by the random bending and curving.

Figure 8A:
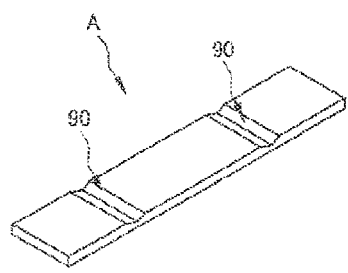
FIGS. 8A and 8B are oblique views of an electrode tab having slits constructed as an embodiment according to the principles of the present invention.

Therefore, in one embodiment according to the principles of the present invention as shown in FIG. 8A, slits 90 for bending are formed on the surface of first electrode tabs 20 and second electrode tabs 30 for easy bending in the present invention. Slit 90 is formed to have a certain depth, and is formed on a major surface of first electrode tab 20 or second electrode tabs 30. As shown in FIG. 8, a vertical cross-section of slit 90 along a longitudinal axis of the second battery is a notch, i.e., a V-shaped indentation.

That is, since the length of first electrode tab 20 and second electrode tab 30 is larger than the distance between the upper end of jelly-roll 40 and cap plate 50, the electrode tabs are bent to compensate the difference in length. In this configuration, slits 90 are formed to correspond to predetermined bending portions. As described above, while fitting cap plate 50 in case 10, electrode tabs A can be bent, by forming bending lines, i.e., slits 90, on the surface of electrode tabs A by partially pressing or cutting the surface.

Therefore, electrode tabs A are naturally bent along slits 90, when cap plate 50 is fitted in case 10 and electrode tabs A is pressed, because the hardness is low at slits 90. Obviously, electrode tabs A are bent by slits 90 and are not influenced by excessive friction or load, thereby improving durability.

Figure 8B:
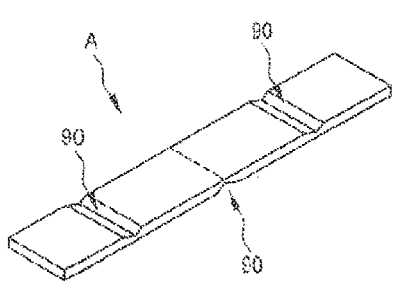

Further, as shown in FIG. 8B, slits 90 according to another embodiment of the present invention may be formed alternately at both sides at predetermined distance between first electrode tab 20 and second electrode tab 30.

Slits 90 are formed on both sides of electrode tabs A, in which a slit is formed on the front side and another slit is formed on the rear side at a distance from the previously formed slit. That is, electrode tabs A are bent in a zigzag shape by alternately forming slits 90 on the front side and the rear side of electrode tabs A. Accordingly, electrode tabs A are folded while cap plate 50 is fitted in case 10.

FIG. 8A shows an embodiment of slits 90 reduced in thickness by pressing etc., at a predetermined distance on one side of electrode tabs A. Electrode tab A according to this embodiment can be folded in one direction with respect to slits 90.

Figure 8C:
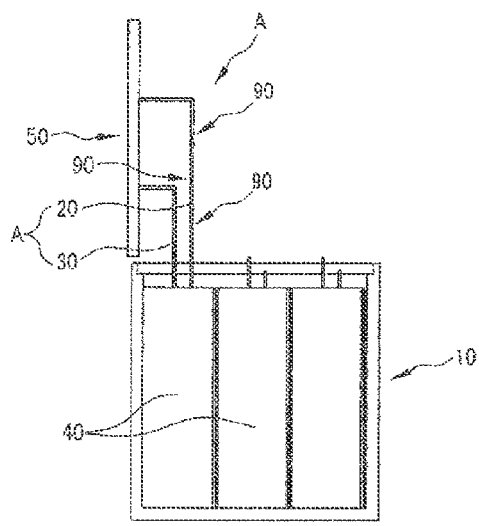
FIGS. 8C and 8D are cross-sectional views showing the shape of electrode tabs bent along the slits, as an embodiment according to the principles of the present invention.

FIG. 8B shows an example of alternately forming grooves, such as slits 90, that transverse the widths of the electrode tabs at a predetermined distance on both front and rear sides of electrode tab A. These transverse grooves, shown as slits 90, cause the elongate shape of the electrode tabs to fold, or to pleat, along their respective lengths, as cap plate 50 is rotated from a vertically standing position such as is shown in FIG. 7A or in FIG. 8C, to a closed position as shown in FIG. 7B or in FIG. 8D, in order to close and seal the opened end of case 10. Electrode tab A can be folded once in the front direction and then to the rear direction. Further, FIG. 8C shows when an electrode tab A with slits 90 are connected with electrode terminal 60. Jelly-rolls 40 are disposed in case 10 and electrode tabs A protruding from jelly-rolls 40 are welded to electrode terminals 60 of cap plate 50 which is vertically standing. Thereafter, cap plate 50 is press-fitted in opening 11 of case 10. In this configuration, electrode tabs A are bent and folded as much as the differences in distances between cap plate 50 and jelly-rolls 40.

Figure 8D:
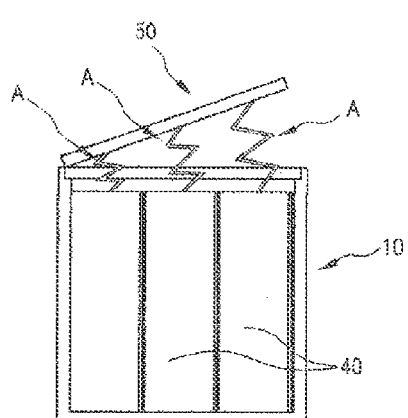

FIG. 8D shows when electrode tabs A are naturally and sequentially bent and folded along slits 90 while cap plate 50 is fitted in opening 11 of case 10.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and-equivalents thereof.

What is claimed is:

1. A secondary battery, comprising:
   a plurality of jelly-rolls each having a first electrode tab and a second electrode tab protruding from the jelly-roll;
   a case having an opening and receiving the jelly-rolls; and
   a cap plate sealing the opening of the case and having at least one elongated terminal through hole in which at least one electrode terminal is disposed to extend from a top side to a bottom side of the cap plate facing the jelly-rolls, the at least one elongated terminal through hole extending over several of the jelly-rolls,
   each first electrode tab being electrically connected to the at least one electrode terminal and each second electrode tab being electrically connected to the cap plate.

2. The secondary battery as claimed in claim 1, wherein the jelly-rolls are formed in one of a cylindrical shape and a flat tubular shape.

3. The secondary battery as claimed in claim 1, further comprising an insulating case disposed between the jelly-rolls and the cap plate, the insulating case having a plurality of holes through which the first electrode tabs and the second electrode tabs physically pass.

4. The secondary battery as claimed in claim 3, wherein the insulating case is made of an elastic material.

5. The secondary battery as claimed in claim 1, wherein each first electrode tab has negative polarity and each second electrode tab has positive polarity.

6. The secondary battery as claimed in claim 1, wherein each first electrode tab and the at least one electrode terminal are electrically connected by welding, and each second electrode tab and the cap plate, are electrically connected by welding.

7. The secondary battery as claimed in claim 1, wherein the cap plate and the at least one electrode terminal are electrically insulated from each other.

8. The secondary battery as claimed in claim 7, further comprising an insulation layer between the cap plate and the at least one electrode terminal.

9. The secondary battery as claimed in claim 7, further comprising an insulation block between the cap plate and the electrode terminal.

10. The secondary battery as claimed in claim 9, wherein the insulating block has an outer side formed in the same shape as the elongated terminal through hole, and the insulating block further comprise an electrode terminal hole formed through the insulating block, an inner side of the electrode terminal hole being formed in the same shape as the at least one electrode terminal.

11. The secondary battery as claimed in claim 9, the insulating block having at least one step extending orthogonally outward from the insulating block.

12. The secondary battery as claimed in claim 1, wherein a plurality of exteriors of the first electrode tabs and the second electrode tabs are coated with an electrically insulating coating layer.

13. The secondary battery as claimed in claim 1, wherein the first electrode tabs and the second electrode tabs have widths transversed by grooves facilitating bending of the lengths of the first electrode tabs and the second electrode tabs.

14. The secondary battery as claimed in claim 13, wherein the grooves are alternately formed at spaced-apart locations on both sides of the first electrode tabs and the second electrode tabs.

15. The secondary battery as claimed in claim 1, wherein the first electrode tabs are in alignment and the second electrode tabs are in alignment.

16. The secondary battery as claimed in claim 1, the at least one electrode terminal being one of a cathode electrode terminal or an anode electrode terminal.

* * * * *